United States Patent
Choi

(10) Patent No.: US 11,936,166 B2
(45) Date of Patent: Mar. 19, 2024

(54) SWITCHBOARD MONITORING SYSTEM

(71) Applicant: LS ELECTRIC CO., LTD., Anyang-si (KR)

(72) Inventor: Ji-Hyun Choi, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 881 days.

(21) Appl. No.: 16/971,916

(22) PCT Filed: Jan. 10, 2019

(86) PCT No.: PCT/KR2019/000385
§ 371 (c)(1),
(2) Date: Aug. 21, 2020

(87) PCT Pub. No.: WO2019/194397
PCT Pub. Date: Oct. 10, 2019

(65) Prior Publication Data
US 2020/0403387 A1  Dec. 24, 2020

(30) Foreign Application Priority Data

Apr. 3, 2018 (KR) .................. 10-2018-0038727

(51) Int. Cl.
*H02B 1/30* (2006.01)
*H02B 13/035* (2006.01)
*H04N 5/33* (2023.01)

(52) U.S. Cl.
CPC ......... *H02B 1/306* (2013.01); *H02B 13/0356* (2013.01); *H04N 5/33* (2013.01)

(58) Field of Classification Search
None
See application file for complete search history.

(56) References Cited

U.S. PATENT DOCUMENTS

| 7,989,769 | B2 | 8/2011 | Brandt et al. |
| 2016/0100091 | A1* | 4/2016 | Curiel Montoya ......... G06F 3/04842 348/82 |
| 2019/0126549 | A1* | 5/2019 | Esquius ............ B33Y 30/00 |

FOREIGN PATENT DOCUMENTS

| JP | H06-036310 U | 5/1994 |
| JP | 2014153157 A | 8/2014 |
| KR | 20100025937 A | 3/2010 |
| KR | 100984679 B1 | 10/2010 |
| KR | 101421588 B1 | 7/2014 |

(Continued)

OTHER PUBLICATIONS

European Extended Search Report for related European Application No. 19781879.2; action dated Apr. 22, 2021; (11 pages).

(Continued)

*Primary Examiner* — Erica S Lin
(74) *Attorney, Agent, or Firm* — K&L Gates LLP

(57) ABSTRACT

A switchboard monitoring system, according to one embodiment of the present specification, comprises: a thermal imaging apparatus for acquiring thermal imaging information of a device disposed in a switchboard panel; and a control apparatus for receiving the thermal imaging information from the thermal imaging apparatus, generating temperature information of the device on the basis of the received thermal imaging information, and detecting the temperature state of the device on the basis of the generated temperature information.

12 Claims, 9 Drawing Sheets

(56) References Cited

FOREIGN PATENT DOCUMENTS

| KR | 101570640 B1 | 11/2015 |
| KR | 20150122391 A | 11/2015 |
| KR | 101571877 B1 | 12/2015 |
| WO | 2014/105993 A1 | 7/2014 |

OTHER PUBLICATIONS

Office Action for related European Application No. 19781879.2; action dated Mar. 16, 2023; (9 pages).
International Search Report for related International No. PCT/KR2019/000385; action dated Oct. 10, 2019; (5 pages).
Written Opinion for related International No. PCT/KR2019/000385; action dated Oct. 10, 2019; (4 pages).

\* cited by examiner

[FIG. 1]
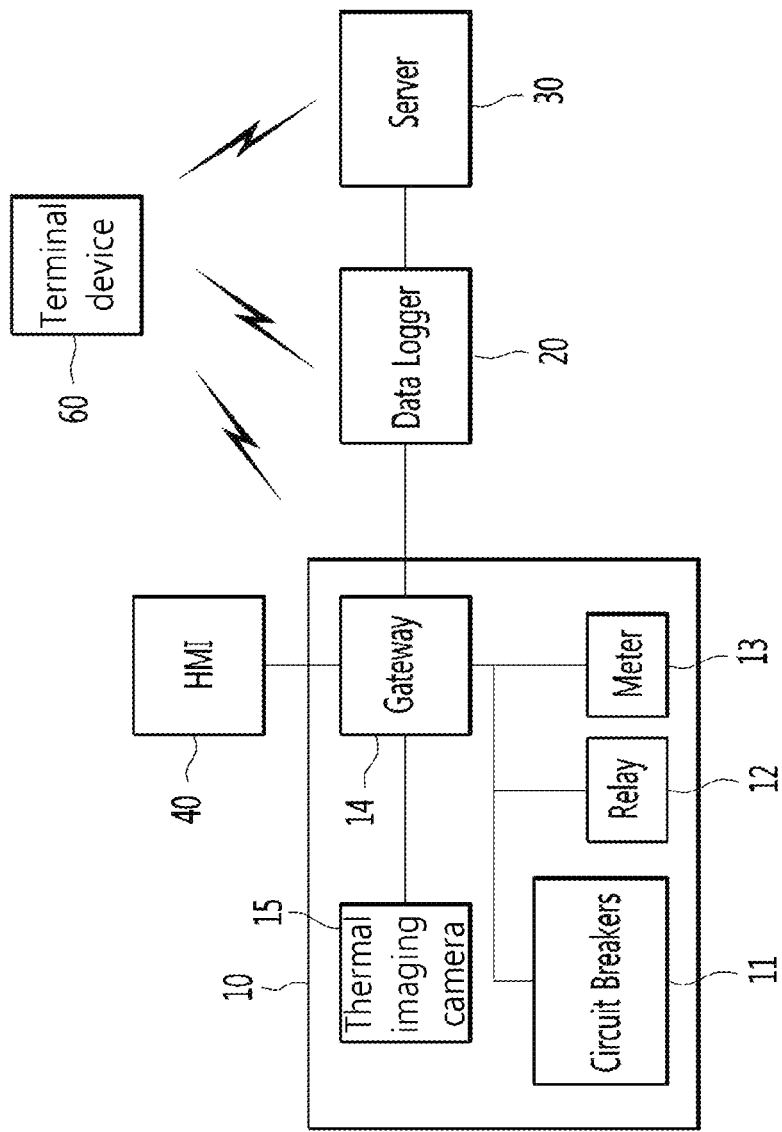

【FIG. 2】
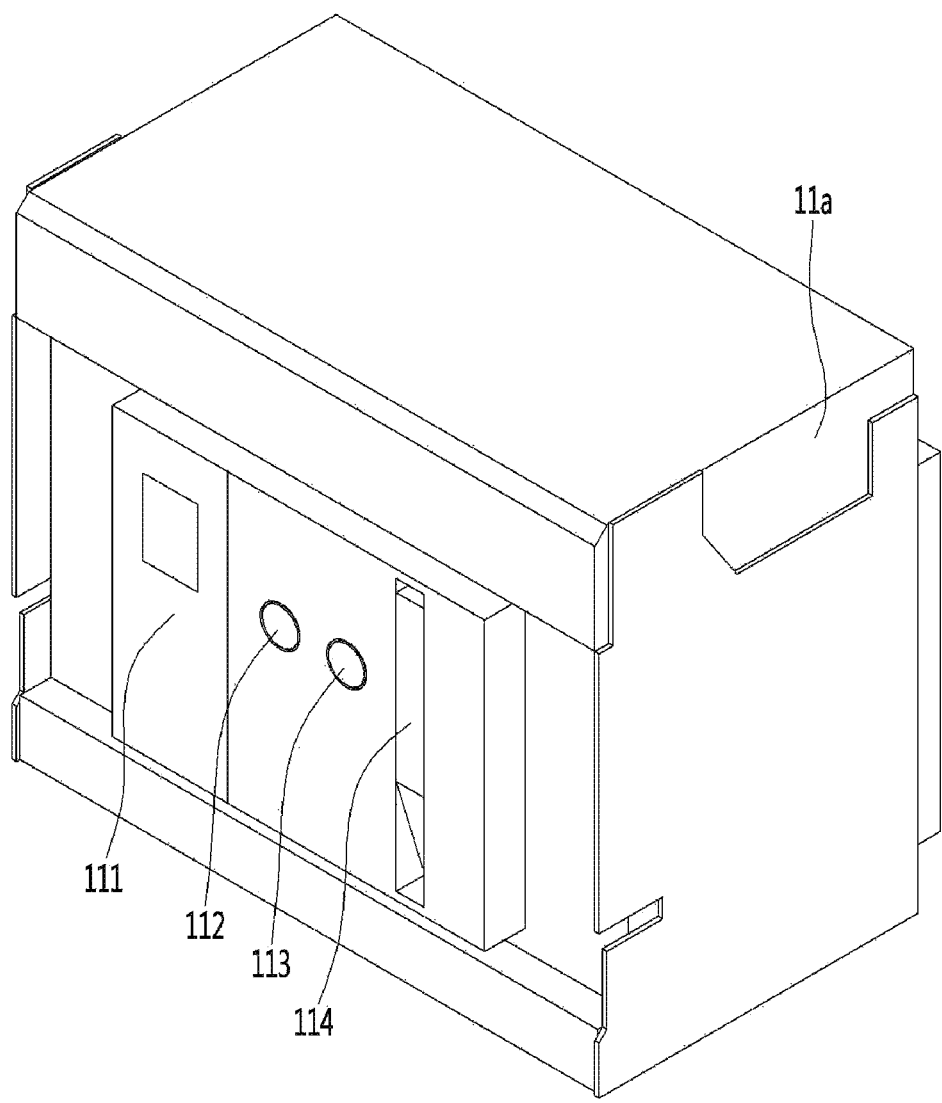

[FIG. 3]
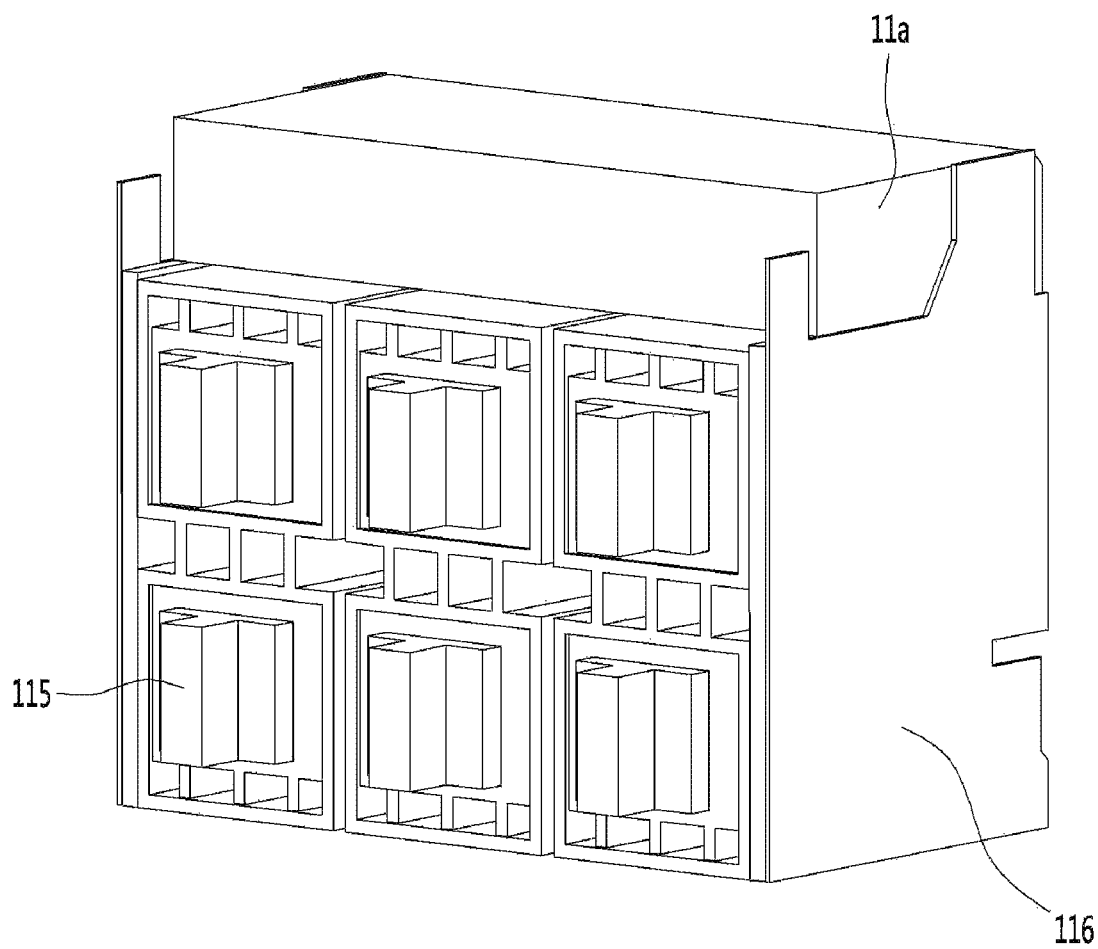

【FIG. 4】
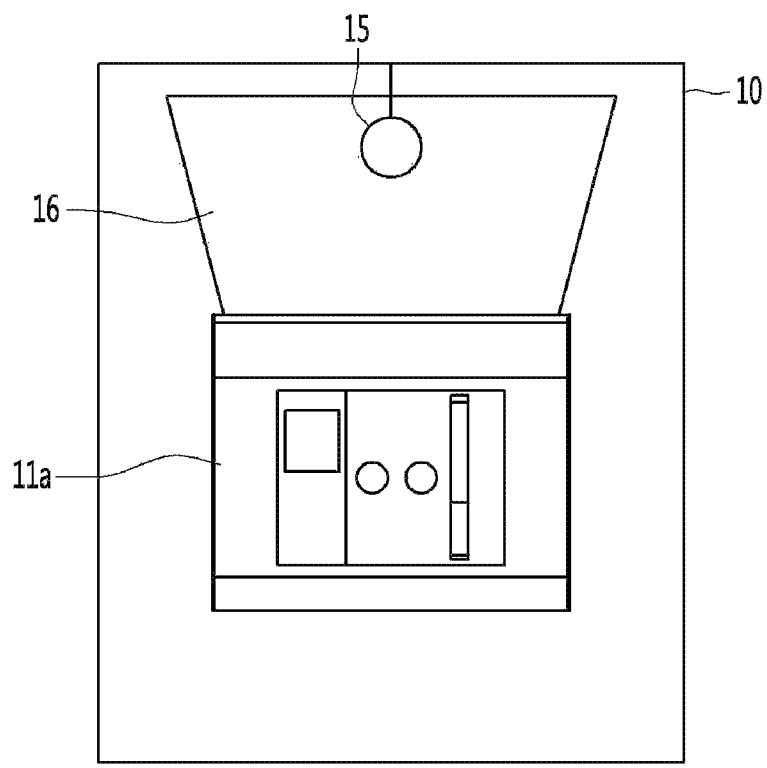

[FIG. 5]
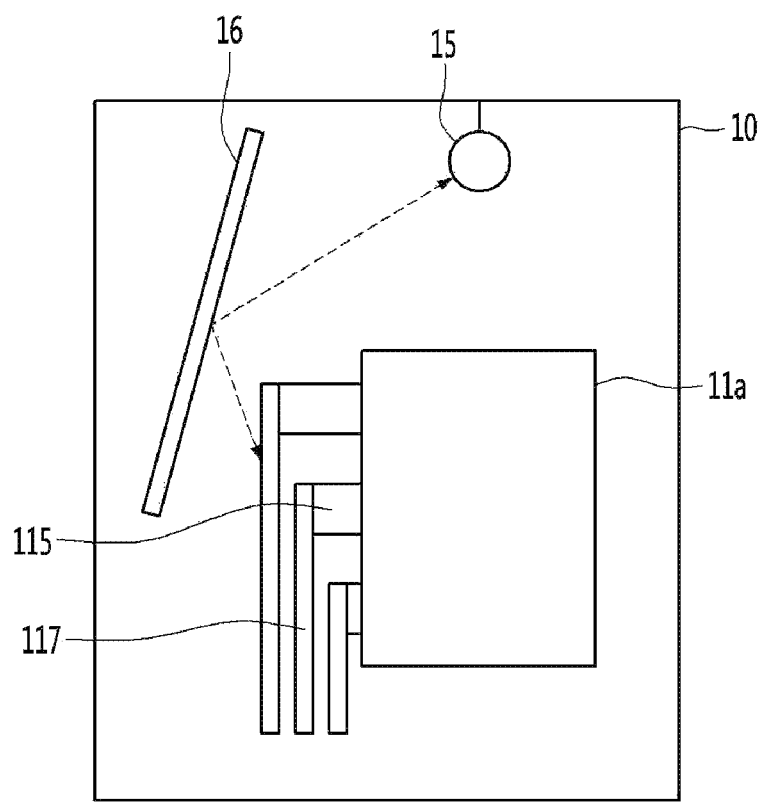

[FIG. 6]
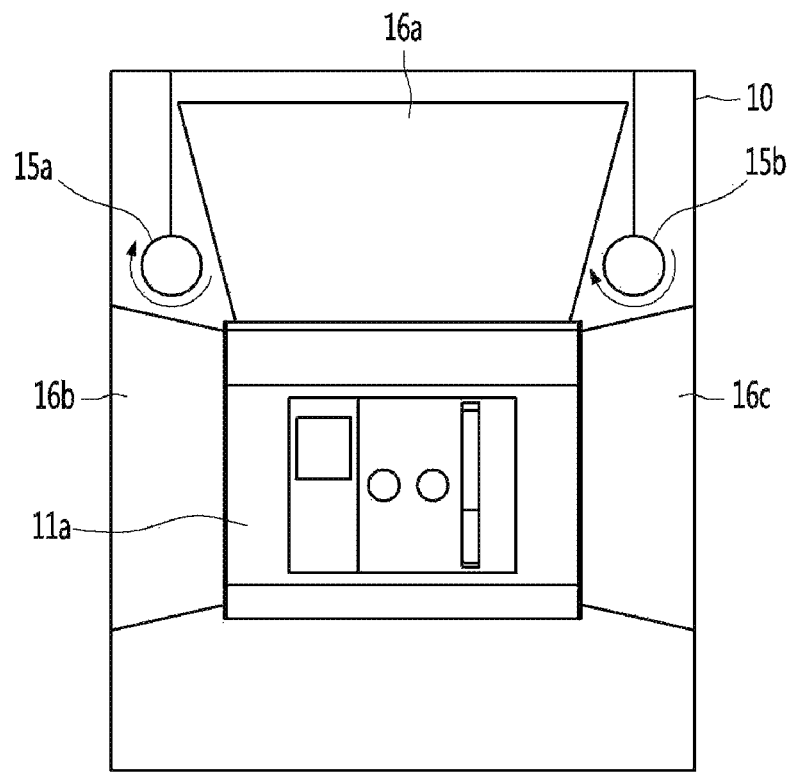

[FIG. 7]
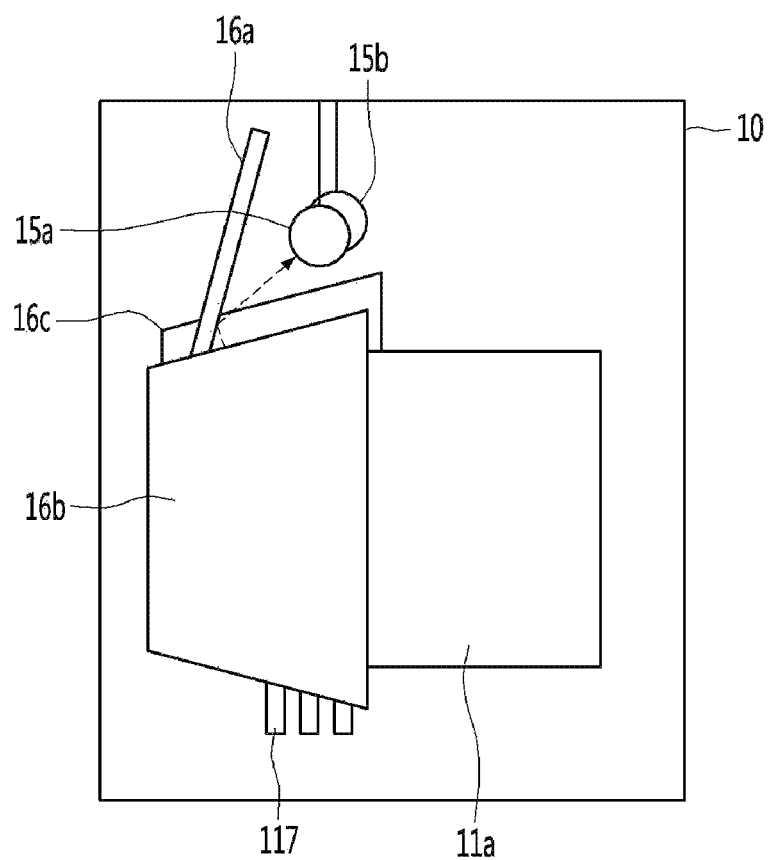

[FIG. 8]
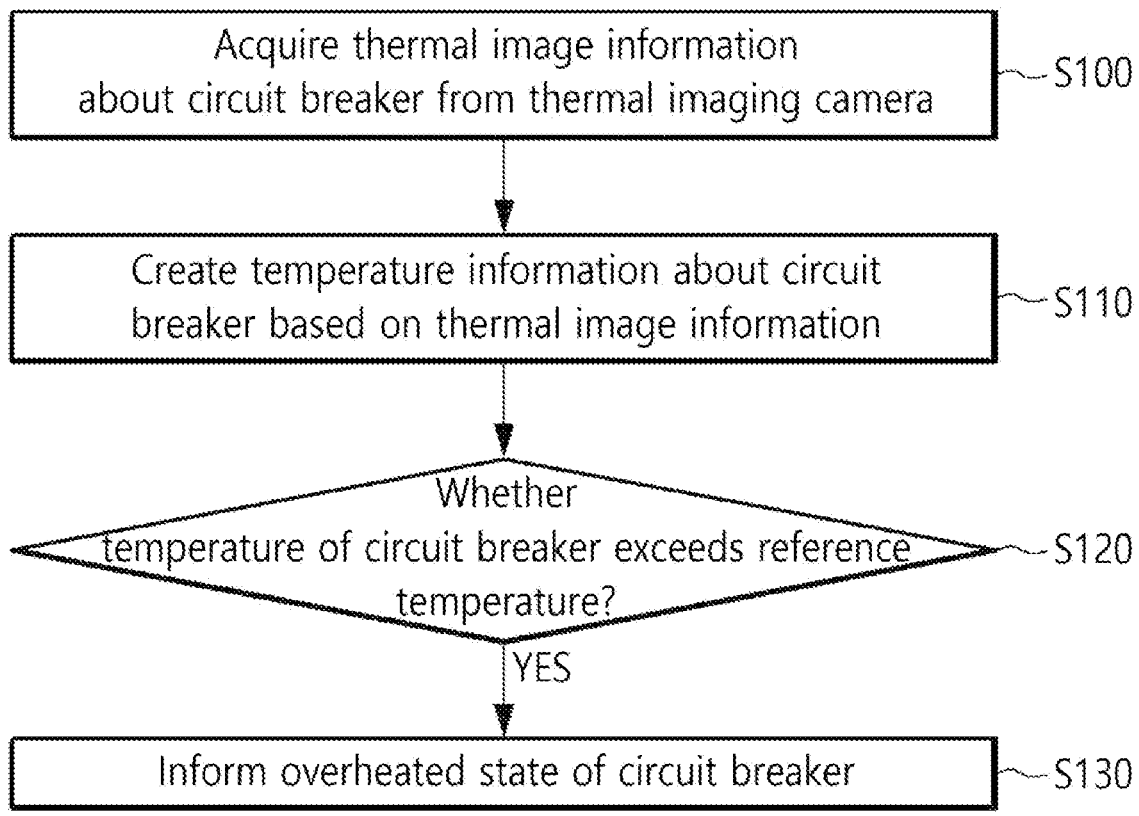

【FIG. 9】
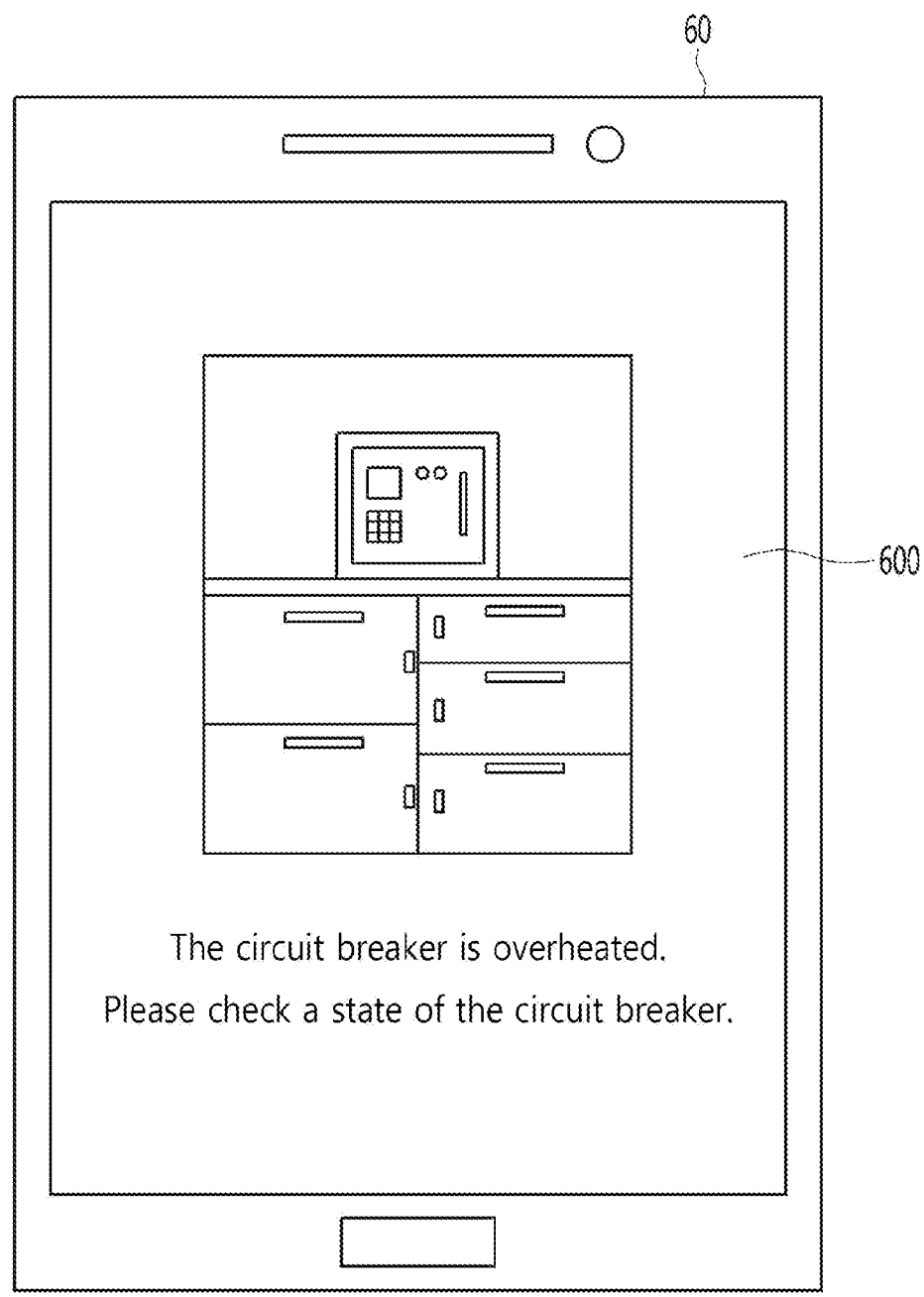

SWITCHBOARD MONITORING SYSTEM

CROSS-REFERENCE TO RELATED APPLICATIONS

The present application is a National Stage of International Application No. PCT/KR2019/000385, filed on Jan. 10, 2019, which claims the benefit of earlier filing date and right of priority to Korean Application No. 10-2018-0038727 filed on Apr. 3, 2018, the contents of which are all hereby incorporated by reference herein in their entirety.

FIELD

The present disclosure relates to a system for monitoring a switchboard, and specifically, to a switchboard monitoring system capable of monitoring a temperature of a device such as a circuit breaker installed in a switchboard panel and performing device management based on the temperature.

BACKGROUND

A number of power devices for power conversion, transmission and measurement are arranged in a switchboard. The power device may include a circuit breaker (CB) disposed on a line along which power is transmitted. When factors such as overcurrent, overvoltage, undervoltage, short circuit, and ground fault are detected on the line, the CB may break the line to protect the switchboard and a load and various systems connected thereto.

The switchboard panel may be opened and closed by a door or the like. Since the door is usually in a closed state, it may be difficult for an operator or a user to grasp a situation inside the switchboard panel before opening the door.

For example, as current flows in the line in the switchboard panel, a temperature of the circuit breaker or other devices connected to the line may change. In particular, as the current flowing in the line increases, the temperatures of the devices may rise up. When the temperatures of the devices are too high, performance deterioration of the devices or operating errors thereof may occur. Further, in some cases, a fire may occur due to an overheated state of the devices.

However, it is difficult for the operator or the user to identify the internal state of the switchboard panel before opening the door. In particular, a device such as the circuit breaker may be overheated at a contact terminal on a rear face thereof. However, the operator or the user may have difficulty in visually identifying the rear face of the circuit breaker.

BRIEF SUMMARY

A purpose of the present disclosure is to provide a switchboard monitoring system that may effectively monitor a temperature of a device disposed in a switchboard to improve management convenience of the device.

In one aspect of the present disclosure, there is provided a switchboard monitoring system comprising: thermal imaging means to acquire thermal image information of a device disposed in a switchboard panel; and a controller configured to: receive the thermal image information from the thermal imaging means; create temperature information of the device based on the received thermal image information; and detect a temperature state of the device based on the created temperature information.

In one embodiment, the controller includes a gateway disposed in the switchboard panel and connected to the thermal imaging means.

In one embodiment, the controller further includes a server to receive the thermal image information from the gateway and to detect the temperature state based on the received thermal image information.

In one embodiment, the switchboard monitoring system further includes reflecting means installed in the switchboard panel, wherein the reflecting means is positioned such that thermal infrared-rays emitted from the device is reflected from the reflecting means toward the thermal imaging means.

The switchboard monitoring system of claim 4, wherein the device is a circuit breaker, wherein a contact terminal connected to a line is formed on a rear face of the circuit breaker, wherein the reflecting means is positioned such that thermal infrared-rays emitted from at least a portion of the rear face including the contact terminal are reflected from the reflecting means toward the thermal imaging means.

In one embodiment, the thermal imaging means is placed on a top, a left side, or a right side of the circuit breaker, and is configured to image the thermal infrared-rays reflected from the reflecting means to acquire the thermal image information.

In one embodiment, the reflecting means is at least partially disposed on a rear side of the circuit breaker, wherein the reflecting means is configured to be movable in a predetermined direction along a rail disposed on the switchboard panel, wherein the thermal imaging means is configured to be rotatable in response to the movement of the reflecting means.

In one embodiment, the reflecting means includes: first reflecting means disposed to reflect thermal infrared-rays emitted from at least a portion of the rear face including the contact terminal toward the thermal imaging means; and second reflecting means disposed to reflect thermal infrared-rays emitted from at least a portion of a side face of the circuit breaker toward the thermal imaging means.

In one embodiment, the controller is configured to: compare a current temperature of the device with a reference temperature, based on the created temperature information; and when the temperature of the device exceeds the reference temperature, detect an overheated state of the device.

In one embodiment, the controller is configured to transmit data including a message or a notification indicating the overheated state of the device to a terminal device.

According to various embodiments of the present disclosure, the switchboard monitoring system includes the thermal imaging camera that detects the temperature of the device such as the circuit breaker disposed in the switchboard panel, thereby to effectively provide the temperature information of the device to the operator or the user. Accordingly, management convenience of the device by the operator or the user may be improved.

Further, placing the infrared-ray reflecting means in the switchboard panel may allow detecting the temperatures at various positions of the device only with the thermal imaging camera.

BRIEF DESCRIPTION OF THE DRAWINGS

FIG. 1 is a schematic diagram for illustrating a switchboard monitoring system according to an embodiment of the present disclosure.

FIG. 2 and FIG. 3 are exemplary views showing front and rear faces of a circuit breaker among devices included in a switchboard panel, respectively.

FIG. 4 and FIG. 5 are diagrams showing an example of arrangement in which a thermal imaging camera and reflecting means of a switchboard monitoring system according to an embodiment of the present disclosure are disposed in a switchboard panel.

FIG. 6 and FIG. 7 are diagrams showing another example of arrangement in which a thermal imaging camera and reflecting means of a switchboard monitoring system according to an embodiment of the present disclosure are disposed in a switchboard panel.

FIG. 8 is a flowchart for describing an operation of a switchboard monitoring system according to an embodiment of the present disclosure.

FIG. 9 is an example diagram of an operation in which a switchboard monitoring system notifies an operator or a user of an overheated state of a circuit breaker via a terminal device when the overheated state of the circuit breaker is detected according to the embodiment of FIG. 8.

DETAILED DESCRIPTION

Hereinafter, exemplary embodiments disclosed in the present disclosure will be illustrated in detail with reference to the accompanying drawings. The same or similar elements will be assigned the same reference numbers throughout the accompanying drawings. Overlapping descriptions between the exemplary embodiments will be omitted. As used herein, a suffix "module" or "unit" as used for a component are intended only for ease of writing the present disclosure, and the suffix "module" or "unit" itself does not have a specific meaning or role. Further, in describing the embodiments disclosed in the present disclosure, detailed descriptions of well-known components are omitted when it is determined that the detailed descriptions of the well-known components obscure gist of the embodiments disclosed in the present disclosure. Further, it should be understood that the attached drawings are set forth only for easy understanding of the embodiments disclosed in the present disclosure, and a technical spirit disclosed in the present disclosure is not limited to the attached drawings, and all changes, equivalents, or substitutes to or with the embodiments disclosed in the present disclosure are included in the scope of the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

As used herein, the singular forms "a" and "an" are intended to include the plural forms as well, unless the context clearly indicates otherwise.

It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Hereinafter, exemplary embodiments of the present disclosure will be described in detail with reference to the accompanying drawings in the present disclosure.

FIG. 1 is a schematic diagram for illustrating a switchboard monitoring system according to an embodiment of the present disclosure. FIG. 2 and FIG. 3 are exemplary views showing front and rear faces of a circuit breaker among devices included in a switchboard panel, respectively.

Referring to FIG. 1, the switchboard monitoring system (hereinafter referred to as 'monitoring system') may include a plurality of circuit breakers 11, a relay 12, a meter 13, and a gateway 14 disposed inside a switchboard panel 10, a data logger 20, and a server 30. The monitoring system is not composed of only the components shown in FIG. 1. Thus, the monitoring system may include the number of components larger or smaller than the number thereof as shown in FIG. 1.

The plurality of circuit breakers 11 may be disposed inside the switchboard panel 10. The number of the circuit breakers placed inside the switchboard panel 10 may be determined based on the number of branched lines inside the switchboard panel 10. For example, each of the circuit breakers 11 may be fixedly installed into a slot or the like inside the switchboard panel 10.

When factors such as overcurrent, overvoltage, undervoltage, short circuit, and ground fault are detected on each line, each of the circuit breakers 11 may break each line to protect the switchboard and a load or various systems connected thereto. The circuit breakers 11 may have 1:1 correspondence to the lines, so that a breaking operation of each corresponding line may be performed by each corresponding circuit breaker (CB). Each of the circuit breakers 11 may be implemented as an air circuit breaker (ACB), a molded case circuit breaker (MCCB), or a molded circuit breaker (MCB). Generally, ACB with the highest allowable current may be placed on an higher level line, and MCB with the lowest allowable current may be placed on a lower level line.

Each of the circuit breakers 11 is disposed on each of the branched lines in the switchboard panel 10. Thus, an ancestry relationship between the lines may correspond to an ancestry relationship between the circuit breakers 11.

Each of the circuit breakers 11 may include a switch (not shown). When the switch of each of the circuit breakers 11 is turned off, a corresponding line may be cut off and power supply may be stopped. When the switch of each of the circuit breakers 11 is turned on, the power supply may be resumed. For example, each of the circuit breakers 11 may turn each switch on/off based on a control signal received from the gateway 14. According to another embodiment, the switch may be turned on/off by an operator or a user manually manipulating the switch. The switch may be embodied in a form of a physical switch which may be displaced when the switch is turned on/off and vibration may occur at a specific level.

In this regard, referring to FIG. 2 and FIG. 3, the circuit breaker 11a may include a trip relay 111, power buttons 112 and 113, a switch (a lever) 114, contact terminal 115, a cradle 116 and the like. In FIG. 2 and FIG. 3, ACB is shown as an example of the circuit breaker 11a. However, an example of the circuit breaker 11a is not limited thereto.

The trip relay 111 may display measurement information, state information (ground fault, short circuit, overload, etc.), rated current information, and the like relate to a line on which the circuit breaker 11a is disposed. Further, the trip relay 111 may perform a protection operation of the circuit breaker 11a and line in an event of the ground fault, short circuit, or overload.

The power buttons 112 and 113 may include a power off button 112 for turning off power of the circuit breaker 11a, and a power on button 113 for turning on the power thereof.

The switch 114 may be manipulated by an operator or a user to perform a line breaking operation of the circuit breaker 11a. For example, when the switch 114 is turned off, the line on which the circuit breaker 11a is disposed is cut off, and thus supply of current to the line may be stopped.

The contact terminal 115 may connect the circuit breaker 11a to the line. For example, current supplied from a higher level line may be supplied to a lower level line or a load through the contact terminal 115. As current flows through the contact terminal 115, heat may be generated from the contact terminal 115. As an amount of current flowing through the contact terminal 115 increases, the heat generated from the contact terminal 115 may increase. Further, the larger a capacity of the circuit breaker 11a, the larger a size or a volume of the contact terminal 115. In this case, a bulky contact terminal 115 may have different heat amounts generated at different portions thereof. As a result, temperatures at various portions of the contact terminal 115 may be different from each other. Therefore, the monitoring system needs to be implemented to enable monitoring of temperatures at various points of the contact terminal 115.

Referring back to FIG. 1, the relay 12 may be controlled to supply or cut off power to a load such as a motor. When an accident current such as overcurrent or short circuit current occurs in the load, the relay 12 may protect the load. The relay 12 may be implemented as an electronic motor protection relay (EMPR), but is not limited thereto.

The meter 13 may measure and monitor a power amount of a power system of the switchboard. For example, the meter 13 may be implemented as a digital integrated meter (GIMAC), but is not limited thereto.

The at least one gateway 14 may be disposed inside the switchboard panel 10. According to another embodiment, the at least one gateway 14 may be disposed outside the switchboard panel 10.

The at least one gateway 14 may be connected to the circuit breakers 11, the relay 12, and the meter 13 in the switchboard panel 10 via wired or wireless communication (for example, RS485) and may receive various information related to an operating state of the switchboard from the circuit breakers 11, the relay 12, and the meter 13, respectively. The gateway 14 may transmit the received information to the data logger 20 or the server 30. Further, the at least one gateway 14 may receive a control command related to a component connected thereto among the components inside the switchboard panel 10 from the data logger 20 or the server 30. Further, the at least one gateway 14 may control the components 11, 12, and 13 based on the received control command, or may create the control command directly to control the components 11, 12, and 13.

According to an embodiment, the at least one gateway 14 may be connected to a human machine interface (HMI) 15. The HMI 40 may be disposed on an outer face of the switchboard panel 10 or may be external to the switchboard panel 10. The HMI 40 may receive various information related to an operating state of each of the components in the switchboard panel 10 from the at least one gateway 14 and display the information in graphic or text form. Further, the HMI 40 may receive various commands or requests related to an operation of the switchboard from the operator or the user, and may send the received commands or requests to the gateway 14. The gateway 14 may process the commands or requests received from the HMI 40 and may output the processing result on the HMI 40.

The data logger 20 may be connected to the gateway 14 and the server 30 via wired or wireless communication. The data logger 20 may receive various information related to operations of the gateway 14 and the lower level devices (the circuit breakers 11, the relay 12, the meter 13, etc.), and may send the received information to the server 30. Further, the data logger 20 may transmit a control command received from the server 30 to the gateway 14.

The server 30 may be implemented in a form of a cloud server to manage information about operations of the components in switchboard panel 10 in an integrated manner.

The gateway 14, the data logger 20, or the server 30 may correspond to a controller of a switchboard control system. The controller may control the components 11, 12, and 13 in the switchboard panel 10.

The gateway 14, the data logger 20, or the server 30 may be connected to a terminal device 60 (e.g., a smartphone, a tablet PC, a laptop, a desktop, etc.) of the operator or the user via various known communication schemes. That is, the controller may transmit various information related to the operation of the switchboard to the terminal device 60. Further, the controller may receive the control command for controlling the components 11, 12, and 13 in the switchboard panel 10 from the terminal device 60, and may create a control signal based on the received control command and transmit the control signal to the components 11, 12, and 13.

Power may be supplied to a load through a line in the switchboard panel 10 in response to an operation of the switchboard. As the current flows in the line, a temperature of the circuit breaker 11 connected to the line may fluctuate. In particular, as an amount of current flowing in the line increases, the temperature of the circuit breaker 11 may increase. In this connection, when the temperature of the circuit breaker 11 is too high, performance deterioration of the circuit breaker 11 or an operation error thereof may occur during operation thereof. Further, in some cases, the supply of the power to the load may be unexpectedly stopped or a fire may occur due to failure of the circuit breaker resulting from the overheated state of the circuit breaker 11.

However, it is difficult for the operator or the user to identify a state of the circuit breaker 11 inside the switchboard panel before opening the door of the switchboard panel 10. In particular, the circuit breaker 11 may be overheated mainly at the contact terminal on a rear face of the circuit breaker. However, the operator or the user may not observe the rear face of the circuit breaker 11.

In order to solve the above-described problem, the monitoring system according to an embodiment of the present disclosure may include thermal imaging means (e.g., a thermal imaging camera 15) installed in the switchboard panel 10.

When the circuit breaker 11 operates, heat may be generated from the contact terminal disposed on the rear face of the circuit breaker 11. Thus, thermal infrared-rays may be emitted from the heat as generated. The thermal imaging camera 15 may acquire thermal image information (thermal image data) by imaging the emitted thermal infrared-rays. A controller such as the server 30 may create temperature information of the circuit breaker 11 based on the thermal image information.

In one example, reflecting means may be disposed within the switchboard panel 10 to allow the thermal image information at various positions of the circuit breaker 11 to be obtained only using the thermal imaging camera 15. When using a combination of the reflecting means and the thermal imaging camera 15, the monitoring system may easily obtain the thermal image information at various positions of the circuit breaker 11, or at various points of the bulky contact terminal. Examples related to arrangement of the reflecting means and the thermal imaging camera 15 will be described with reference to FIG. 3 to FIG. 4 below.

According to an embodiment, the thermal imaging camera 15 may acquire the thermal image information about various devices 12 and 13 as well as the circuit breaker 11 in the switchboard panel 10. However, hereinafter, for convenience of description, embodiments in which the thermal imaging camera 15 acquires thermal image information about the circuit breaker 11 are described.

FIG. 4 and FIG. 5 are diagrams showing an example of arrangement in which the thermal imaging camera and the reflecting means of the switchboard monitoring system according to an embodiment of the present disclosure are disposed in the switchboard panel.

Referring to FIG. 4 and FIG. 5, one thermal imaging camera 15 and one reflecting means 16 may be disposed within the switchboard panel 10.

As described above, the heat generated from the circuit breaker 11*a* may be mainly generated from the contact terminal 115 disposed on the rear face thereof. Therefore, the thermal imaging camera 15 may be disposed to image the rear face of the circuit breaker 11*a*.

In this connection, when the thermal imaging camera 15 is placed on the rear face of the circuit breaker 11*a*, the operator or the user may experience inconvenience in identification or inspection of the thermal imaging camera 15 due to the circuit breaker 11*a*.

Therefore, the thermal imaging camera 15 may be disposed on a top (or a left or right side) of the circuit breaker 11*a*, as shown in FIG. 4 to FIG. 5 and may image the rear face of the circuit breaker 11*a* using the reflecting means 16 installed in the switchboard panel 10. In this case, the reflecting means 16 may be at least partially positioned at a rear side of the circuit breaker 11*a*.

Specifically, thermal infrared-rays emitted from the heat generated from the contact terminal 115 may be reflected from the reflecting means 16. That is, the reflecting means 16 may correspond to infrared-ray reflecting means 16 that reflects the infrared-ray light. The thermal imaging camera 15 may acquire the thermal image information including the thermal infrared-rays reflected from the infrared-ray reflecting means 16. That is, the infrared-ray reflecting means 16 may be installed to reflect the thermal infrared-rays emitted from the rear face of the circuit breaker 11*a* toward the thermal imaging camera 15.

The infrared-ray reflecting means 16 may include an infrared-ray reflective film or a mirror coated with an infrared-ray reflective coating. For example, the infrared-ray reflective film or the infrared-ray reflective coating may include an infrared-ray reflective material such as titanium dioxide ($TiO_2$).

Further, it may be difficult for the single infrared-ray reflecting means 16 to reflect the thermal infrared-rays emitted from various positions of the circuit breaker 11*a* toward the thermal imaging camera 15. Alternatively, the contact terminal 115 may not be smoothly reflected due to the line (a cable) 116 connected to the contact terminal 115. Accordingly, the infrared-ray reflecting means 16 may be installed in the switchboard panel 10 so as to be able to move by a predetermined distance in up, down, left, and right directions.

To this end, a rail may be disposed on the switchboard panel 10. The infrared-ray reflecting means 16 may be installed to be movable along the rail. The infrared-ray reflecting means 16 may reflect the thermal infrared-rays emitted from various positions of the circuit breaker 11*a* toward the thermal imaging camera 15 while moving in a predetermined direction. As a result, the thermal imaging camera 15 may acquire the thermal image information about various positions of the circuit breaker 11*a*.

According to another embodiment, the thermal imaging camera 15 may rotate when the infrared-ray reflecting means 16 moves. That is, the thermal imaging camera 15 may rotate based on the direction of the movement of the infrared-ray reflecting means 16, so that the thermal infrared-ray reflected from the infrared-ray reflecting means 16 may be obtained more effectively by the thermal imaging camera 15.

As described above, the larger the capacity of the circuit breaker 11*a*, the larger the size or the volume of the contact terminal 11. In this case, the bulky contact terminal 115 may have different heat amounts generated from different portions thereof. As a result, the temperatures of the portions of the contact terminal 115 may be different from each other. Thus, moving the infrared-ray reflecting means 16 and/or rotating the thermal imaging camera 15 may allow the thermal image information at various points of the contact terminal 115 to be obtained more effectively by the thermal imaging camera 15.

FIG. 6 and FIG. 7 are diagrams showing another example of arrangement in which the thermal imaging camera and the reflecting means of the switchboard monitoring system according to an embodiment of the present disclosure are disposed in the switchboard panel.

Referring to FIG. 6 and FIG. 7, the switchboard panel 10 may receive a plurality of thermal imaging cameras 15*a* and 15*b* and a plurality of infrared-ray reflecting means 16*a* to 16*c*.

Each of the plurality of infrared-ray reflecting means 16*a* to 16*c* may be arranged to reflect the thermal infrared-ray emitted from the heat generated from a side face or a rear face of the circuit breaker 11*a* toward the plurality of thermal imaging cameras 15*a* and 15*b*. For example, first infrared-ray reflecting means 16*a* may be installed to reflect the thermal infrared-ray emitted from the rear face of the circuit breaker 11*a* toward the plurality of thermal imaging cameras 15*a* and 15*b*. Second infrared-ray reflecting means 16*b* and third infrared-ray reflecting means (16*c*) may be installed to reflect the thermal infrared-rays emitted from the rear and side faces of the circuit breaker 11*a* toward the thermal imaging cameras 15*a* and 15*b*.

The plurality of thermal imaging cameras 15*a* and 15*b* may acquire thermal image information by imaging the thermal infrared-rays reflected from the plurality of infrared-ray reflecting means 16*a* to 16*c*.

Unlike the embodiments shown in FIG. 4 to FIG. 5, in this embodiment, the plurality of thermal imaging cameras 15*a* and 15*b* and the plurality of infrared-ray reflecting means 16*a* to 16*c* may be disposed in the switchboard panel 10 such that the monitoring system ma effectively acquire the thermal image information at various positions of the circuit breaker 11*a*.

In another example, in a manner similar to that described with reference to FIG. 4 to FIG. 5, the plurality of infrared-ray reflecting means 16a to 16c may be configured to be movable in a predetermined direction, and the plurality of thermal imaging cameras 15a and 15b may be configured to be rotatable.

For example, the first infrared-ray reflecting means 16a may be configured to be movable in a horizontal direction along a horizontal rail or the like. The second infrared-ray reflecting means 16b and the third infrared-ray reflecting means 16c may be configured to be movable in a vertical direction along a vertical rail or the like. The thermal imaging cameras 15a and 15b may rotate based on the direction of the movement of the infrared-ray reflecting means 16a to 16c to more effectively acquire the thermal infrared-rays reflected from the infrared-ray reflecting means 16a to 16c.

FIG. 8 is a flowchart for describing an operation of a switchboard monitoring system according to the present disclosure embodiment.

Referring to FIG. 8, the monitoring system may acquire thermal image information about the circuit breaker 11 from the thermal imaging camera 15 (S100).

As described with reference to FIG. 4 to FIG. 7, when the thermal infrared-rays emitted from the circuit breaker 11 are reflected from the infrared-ray reflecting means 16, the at least one thermal imaging camera 15 may obtain the thermal image information including the reflected thermal infrared-rays.

The gateway 14 connected to the at least one thermal imaging camera 15 may receive the thermal image information, and may transmit the received thermal image information to the server 30 through the data logger 20.

The monitoring system may create temperature information about the circuit breaker 11 based on the obtained thermal image information (S110).

The server 30 may create the temperature information about the circuit breaker 11 based on thermal image information.

The thermal image information may include a temperature at each of various positions of the circuit breaker 11. The server 30 may extract the highest temperature among a plurality of temperatures included in the thermal image information, and may create the temperature information about the circuit breaker 11 including the extracted temperature.

That is, when a temperature in a range of 30° C. to 58° C. is included in the thermal image information, the server 30 may create temperature information indicating that the temperature of the circuit breaker 11 is 58° C.

According to an embodiment, the server 30 may calculate a representative value (e.g., an average, a median value, etc.) of a plurality of temperatures included in the thermal image information, and may create temperature information indicating that the temperature of the circuit breaker 11 is the representative value.

The server 30 may store the created temperature information in a memory or database. In this connection, the server 30 may acquire current amount information flowing through the circuit breaker (the contact terminal 115) from the gateway 14, and may store therein the acquired current amount information together with the temperature information. The current amount information and the temperature information may be related to lifespan prediction of the circuit breaker 11. For example, when the current amount flowing through the circuit breaker 11 is at a normal level, but the temperature of the circuit breaker 11 is higher than a reference value, the server 30 may predict that a lifespan (a residual lifespan) of the circuit breaker 11 is small.

The monitoring system may identify whether the temperature of the circuit breaker 11 exceeds a reference temperature based on the created temperature information (S120). The reference temperature may be defined to distinguish whether the circuit breaker 11 is overheated, and may be a value set by the operator.

When the temperature of the circuit breaker 11 exceeds the reference temperature based on the result of identification (YES in S120), the monitoring system may inform the operator or the user of the overheated state of the circuit breaker 11 (S130).

When the temperature of the circuit breaker 11 exceeds the reference temperature, the server 30 may detect the overheated state of the circuit breaker 11. The server 30 may transmit data including a message or a notification indicating the overheated state of the circuit breaker 11 to the terminal device 60 of the user or the operator or may output the data on an output device connected to the server 30. Alternatively, the server 30 may transmit the data including the message or the notification to the gateway 14, and the gateway 14 may output the message or the notification included in the received data on the HMI 40.

According to an embodiment, when the reference temperature includes a plurality of reference temperatures, the server 30 may detect a state of the circuit breaker 11 based on the created temperature information. For example, it is assumed that the reference temperature includes a first reference temperature and a second reference temperature higher than the first reference temperature. When the temperature of the circuit breaker 11 is lower than the first reference temperature, the server 30 may detect that the circuit breaker 11 is in a normal state. When the temperature of the circuit breaker 11 is between the first reference temperature and the second reference temperature, the server 30 may detect that the circuit breaker 11 is in a risk of overheating state. When the temperature of the circuit breaker 11 exceeds the second reference temperature, the server 30 may detect that the circuit breaker 11 is in an overheated state.

The server 30 may provide information about the detected state of the circuit breaker 11 to the operator or the user.

FIG. 9 is an example diagram of an operation in which a switchboard monitoring system notifies an operator or a user of an overheated state of a circuit breaker via a terminal device when the overheated state of the circuit breaker is detected according to the embodiment of FIG. 8.

Referring to FIG. 9, the server 30 may identify whether the temperature of the circuit breaker 11 exceeds the reference temperature based on the temperature information of the circuit breaker 11. The server 30 may detect whether the circuit breaker 11 is overheated based on the identification result.

For example, the temperature information of the circuit breaker 11 may include temperatures at a plurality of points of the circuit breaker 11.

The server 30 may extract the highest temperature among the temperatures at the multiple points. When the extracted temperature exceeds the reference temperature, the server 30 may detect the overheated state of the circuit breaker 11.

According to an embodiment, the server 30 may obtain a representative value (e.g., an average, a median value, etc.) based on the temperatures at the plurality of points. When the obtained representative value (representative temperature) exceeds the reference value (reference temperature), the server 30 may detect the overheated state of the circuit breaker 11.

When the overheated state of the circuit breaker 11 is detected, the server 30 may transmit data including a message or a notification indicating the overheated state of the circuit breaker 11 to the terminal device 60 of t the operator or he user. The terminal device 60 may output a screen 600 informing of the overheated state of the circuit breaker 11, based on the data received from the server 30. The operator or the user may take appropriate measures, such as performing identification and inspection of the circuit breaker 11 based on the displayed screen 600.

According to an embodiment of the present disclosure, the switchboard monitoring system includes the thermal imaging camera that detects the temperature of the circuit breaker and thus may effectively provide the temperature information of the circuit breaker to the operator or the user. Accordingly, management convenience of the circuit breaker by the operator or the user may be improved.

Further, placing the infrared-ray reflecting means in the switchboard panel may allow detecting the temperatures at various positions of the circuit breaker only using the thermal imaging camera. Therefore, an increase in a manufacturing cost of the device for sensing the temperature of the circuit breaker may be minimized.

The above descriptions are merely illustrative of the technical idea of the present disclosure. Those skilled in the art will be able to make various modifications and variations thereto without departing from the essential characteristics of the present disclosure. Therefore, the embodiments disclosed in the present disclosure are not intended to limit the technical idea of the present disclosure, but to illustrate the technical idea of the present disclosure. The scope of the technical idea of the present disclosure is not limited to these embodiments.

The scope of protection of the present disclosure should be interpreted by the claims below. All technical ideas within the equivalent scope to the claims should be interpreted as being included in the scope of the present disclosure.

What is claimed is:

1. A switchboard monitoring system comprising:
   thermal imaging means to acquire thermal image information of a device disposed in a switchboard panel;
   a reflecting means installed in the switchboard panel via a rail system, wherein the rail system permits movement of the reflecting means between a first position and a second position relative to the device; and
   a controller configured to:
   receive the thermal image information from the thermal imaging means;
   create temperature information of the device based on the received thermal image information; and
   detect a temperature state of the device based on the created temperature information.

2. The switchboard monitoring system of claim 1, wherein the controller includes a gateway disposed in the switchboard panel and connected to the thermal imaging means.

3. The switchboard monitoring system of claim 2, wherein the controller further includes a server to receive the thermal image information from the gateway and to detect the temperature state based on the received thermal image information.

4. The switchboard monitoring system of claim 1, wherein the reflecting means is positioned relative to the thermal imaging means such that thermal infrared-rays emitted from the device are reflected from the reflecting means toward the thermal imaging means.

5. The switchboard monitoring system of claim 4, wherein the device is a circuit breaker,
   wherein a contact terminal connected to a line is formed on a rear face of the circuit breaker,
   wherein the reflecting means is positioned such that thermal infrared-rays emitted from at least a portion of the rear face including the contact terminal are reflected from the reflecting means toward the thermal imaging means.

6. The switchboard monitoring system of claim 5, wherein the thermal imaging means is placed on a top, a left side, or a right side of the circuit breaker, and is configured to image the thermal infrared-rays reflected from the reflecting means to acquire the thermal image information.

7. The switchboard monitoring system of claim 6, wherein the reflecting means is at least partially disposed on a rear side of the circuit breaker,
   wherein the thermal imaging means is configured to be rotatable in response to the movement of the reflecting means.

8. The switchboard monitoring system of claim 5, wherein the reflecting means includes:
   first reflecting means disposed to reflect thermal infrared-rays emitted from at least a portion of the rear face including the contact terminal toward the thermal imaging means; and
   second reflecting means disposed to reflect thermal infrared-rays emitted from at least a portion of a side face of the circuit breaker toward the thermal imaging means.

9. The switchboard monitoring system of claim 1, wherein the controller is configured to:
   compare a current temperature of the device with a reference temperature, based on the created temperature information; and
   when the temperature of the device exceeds the reference temperature, detect an overheated state of the device.

10. The switchboard monitoring system of claim 9, wherein the controller is configured to transmit data including a message or a notification indicating the overheated state of the device to a terminal device.

11. The switchboard monitoring system of claim 1, wherein the reflecting means includes:
    a first reflector;
    a second reflector; and
    a third reflector,
    wherein:
    the first reflector is disposed between the second reflector and the third reflector in a horizontal direction and is angled between parallel and perpendicular relative to a rear surface of the device;
    the thermal imaging means is disposed between a first end and a second end of the first reflector in a vertical direction, and above the second reflector and the third reflector in the vertical direction; and
    the second reflector and the third reflector are disposed on opposing sides of the device and are angled between parallel and perpendicular relative to the opposing sides of the device.

12. The switchboard monitoring system of claim 11, wherein the first reflector is configured to move via the rail system in the horizontal direction between the first position and the second position, and wherein the second reflector and the third reflector are configured to move via the rail system in the vertical direction between the between the first position and the second position.

* * * * *